March 28, 1961 D. J. MacGREGOR 2,977,519
SYNCHRONOUS MOTOR CONTROL
Filed May 7, 1959
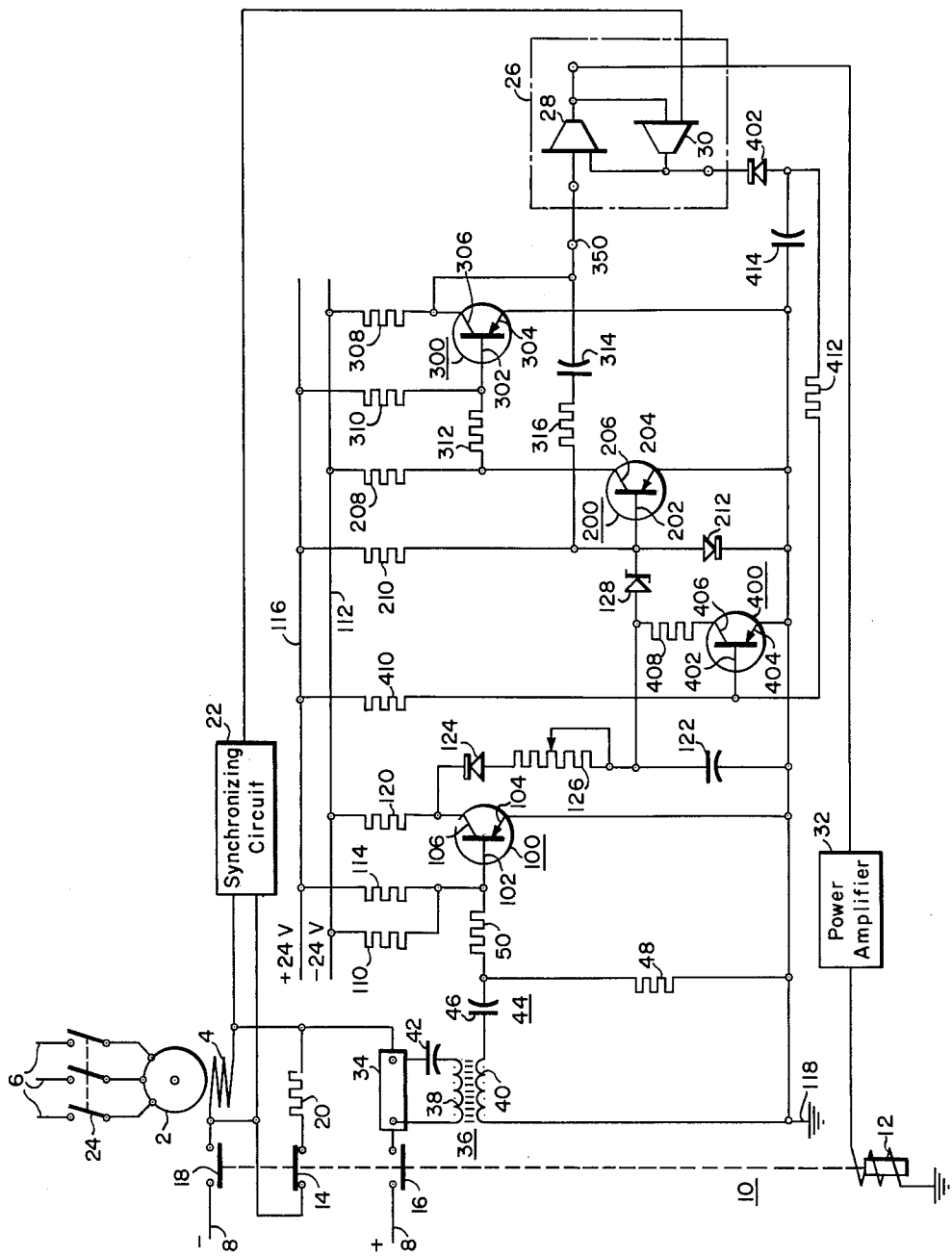
WITNESSES
Ernest P. Klipfel
Edwin E. Bassler
INVENTOR
Dean J. MacGregor
BY
Paul E. Friedemann
ATTORNEY 2,977,519
Patented Mar. 28, 1961

2,977,519

SYNCHRONOUS MOTOR CONTROL

Dean J. MacGregor, Amherst, N.Y., assignor to Westinghouse Electric Corporation, East Pittsburgh, Pa., a corporation of Pennsylvania Filed May 7, 1959, Ser. No. 811,665

4 Claims. (Cl. 318—170)

This invention relates to synchronous controls and more particularly to a system of control for pull-out protection for a synchronous motor.

This invention is an improvement of a synchronous motor control scheme for pull-out protection as disclosed and claimed in a copending application Serial No. 811,664, filed May 7, 1959, and assigned to the same assignee. As more fully described and claimed in the aforementioned application, the pull-out protection system comprises the unique combination of circuit elements which count the cycles of alternating current superimposed on the normal direct current excitation current in the field winding of the synchronous motor. Such a system will sense when the synchronous motor has pulled out of step and distinguish a true pull-out from mechanical or electrical transients of short duration.

The present invention relates to an improvement of the subject matter disclosed in the aforementioned copending application; namely, improving the response of the pull-out protection system, elimination of the bias winding, providing for the resetting of the system immediately after the occurrence of pull-out, and preventing false operation due to transients which occur during synchronizing of the motor during start-up.

The object of this invention is to provide the control system for a synchronous motor having a pull-out protection circuit of greatly improved response and sensitivity.

Another object of this invention is to provide a control circuit for a synchronous motor having a pull-out protection circuit capable of discriminating between transient conditions and true pull-out.

Another object of this invention is to provide a control scheme for a synchronous motor having a pull-out protection circuit capable of resetting its sensing ability for pull-out immediately after a pull-out condition has been cleared.

Another object of this invention is to provide a control scheme for a synchronous motor having a pull-out protection circuit capable of preventing faulty operation due to synchronizing of the motor.

Another object of this invention is to provide a control scheme for a synchronous motor having a pull-out circuit capable of "forgetting" so that minor transients are not "remembered" indefinitely and thereby cause faulty operation of the pull-out protection circuit upon occurrence of an additional transient.

Further objects and advantages of the invention will be readily apparent from the following detailed description taken in conjunction with the drawing in which the sole figure is an electrical schematic diagram of an illustrative embodiment of this invention.

Conventional pull-out detection schemes frequently initiate unnecessary shut-down because of their inability to distinguish between pull-out and mechanical and electrical transients which generate an alternating current in the field winding. The basic difference between these conditions is their duration. Thus, a pull-out protection circuit that requires the occurrence of two or three cycles of generated alternating current in the field winding before providing a pull-out signal is inherently insensitive to currents generated by the rotor motion relative to the stator as caused by the load fluctuations, supply voltage dips, and other transient conditions.

Referring to the Figure 1, the invention is shown embodied in an electrical control system for a synchronous motor 2 having a field winding 4. An alternating current power supply is indicated by the leads 6 while a direct current supply source for excitation is indicated by the excitation leads 8. The excitation leads 8 are illustrated to have a polarity as shown in the drawing, but it is to be understood that opposite polarity may be shown with the appropriate polarity changes throughout the system. A conventional field contactor 10 is illustrated having an operating coil 12, a normally closed contact 14 and two normally open contacts 16 and 18, respectively. The conventional field discharge resistor 20 is connected across the field winding 4 through the normally closed contact 14. The normally open contacts 16 and 18 provide means for connecting the field winding 4 to the excitation leads 8 at the appropriate synchronizing speed as determined by the synchronizing circuit 22 indicated in block form and operably connected across the field winding 4. Both the field contactor 10 and a line switch 24, which connects the synchronous motor 2 to the power lines 6, are illustrated in their unenergized position.

It will be of considerable assistance in understanding the present invention to first consider how the field contactor 10 is energized during synchronization upon start-up of the motor. Upon energization of the synchronous motor 2 by closing the line contactor 24, the proper speed for application of the excitation to the field winding 4 is sensed by the synchronizing circuit 22. The synchronizing circuit 22 may be of any suitable type capable of providing a signal in response to the proper conditions for synchronization. One such synchronizing circuit is described and claimed in my copending application Serial No. 811,615, filed May 7, 1959, and assigned to the same assignee. Upon proper conditions for synchronization, the synchronizing circuit 22 provides an input signal to a logic memory function illustrated as a flip-flop or Memory element 26.

It is to be understood that the Memory element 26 is a bistable device performing a memory logic function which is capable of being triggered to assume one output state and remain in that state even after removal of the triggering influence. The Memory element will assume its opposite state when an appropriate second input is applied to it and will remain in the opposite state even after removal of the second input. The Memory element 26 comprises two logic functions namely a NOR element 28 and NOR element 30. The output of the NOR element 28 is connected to the NOR element 30 and an output from the NOR element 30 is connected to an input of the NOR element 28. For a further description of the operation and characteristics of a NOR logic circuit and a memory logic circuit, reference is made to a publication entitled, "Static Switching Devices," by Robert A. Mathias, "Control Engineering," May 1957. Of course, any suitable form of NOR element or Memory element may be used.

The memory element 26 is adapted to have means for pulsing the element to have no output prior to start-up of the motor 2. The synchronizing circuit 22 provides an input to the NOR element 30 upon attainment of the proper conditions for synchronization. The resultant output from the NOR element 28 is amplified by the power amplifier 32. The amplified output energizes the operating coil 12 causing the normally open contacts 16 and 18 to connect the field winding 4 to the excitation source and momentarily thereafter open the normally closed contact 14 thereby disconnecting the field discharge resistor 20 from the field winding 4. In such a manner, the motor is properly synchronized and steady state operation is attained.

Referring to Fig. 1, the input to the pull-out protection circuit embodying my invention is a voltage developed across a shunt 34 in the excitation circuit. The shunt 34 provides a low loss method for obtaining the current signal. A square loop magnetic core 36 having a primary winding 38 and a secondary winding 40 has its primary winding 38 connected across the shunt 34 through a capacitor 42. The capacitor 42 in series connection with the input to the core 36 serves to block the direct current excitation current in the field winding and preventing such current from saturating the core. The core 36 is selected to have operating characteristics such that a series of pulses is obtained on the secondary side 40 of the core 36, one pulse for each cycle of slip frequency as determined by the voltage developed across the shunt 34.

The pulses are received by a differentiating circuit 44 comprising a capacitor 46 and resistor 48 to provide a narrow pulse signal regardless of the frequency of the alternating current imposed on the field winding 4. Uniform pulses are obtained for each cycle of induced alternating current in the field winding even when the motor is slowly slipping poles. It is to be noted that the induced alternating current in the field winding will have a frequency equivalent to the slip of the synchronous machine.

A transistor 100 having a base electrode 102, an emitter electrode 104 and collector electrode 106 is connected to receive the pulses from the differentiating circuit 44 through an isolating impedance 50 and its base electrode 102. The base electrode 102 is biased negatively through a biasing resistor 110 connected to a negative bus bar 112. The base electrode 102 has imposed upon its negative bias a positive bias of lesser magnitude through a biasing resistor 114 connected to a positive bus bar 116. The emitter electrode 104 is connected to a ground 118 while the collector electrode 106 is connected to the negative bus bar 112 through a current limiting resistor 120. The voltage pulses appearing at the base electrode 102 of the transistor 100 block the transistor 100 for a period of time equivalent to the duration of each voltage pulse appearing at the base electrode 102. During that time the transistor 100 is rendered nonconductive and a certain amount of charge is accumulated on a capacitor 122 connected in series with a rectifier 124 and variable resistor 126 across the emitter-collector circuit of the transistor 100. A like amount of charge will be added to the capacitor 122 during each voltage pulse to the base electrode 102. When the transistor 100 again becomes conductive, the rectifier 124 and a Zener diode 128 prevent the capacitor 122 from discharging. Thus, the voltage across the capacitor 122 increases in increments as each pole is slipped. A Zener diode 128 prevents discharge of the accumulated charge below a predetermined level.

It will be understood that the Zener diode is a semiconductor rectifier, usually a silicone diode, which has the characteristic of blocking current flow in one direction when the voltage is below a predetermined value while current is permitted to flow freely when the voltage is above a predetermined value. The breakdown is nondestructive so the current is cut off when the voltage again drops below the breakdown value. Of course, any device with a breakdown region as described may be used in the place of the Zener diode 128.

Once sufficient poles are slipped to charge the capacitor 122 to the breakdown voltage of the Zener diode 128, a negative pulse appears on the base electrode 202 of a transistor 200. The transistor 200 also has an emitter electrode 204 and a collector electrode 206. The emitter electrode 204 is connected to ground 118 while the collector electrode 206 is connected to the negative bus bar 112 through a current limiting resistor 208. The base electrode 202 is positively biased through a biasing resistor 210 connected to the positive bus bar 116. The base electrode 202 is also connected to ground 118 through a rectifier 212.

The second transistor 300 having a base electrode 302, an emitter electrode 304 and a collector electrode 306 is connected with the emitter electrode 304 connected to ground 118 and collector electrode 306 connected to the negative bus bar 112 through a current limiting resistor 308. The base electrode 302 is positively biased by the positive bus bar 116 through a dropping resistor 310. The base electrode 302 is connected to the collector electrode 206 through an isolating impedance 312.

Once sufficient poles are slipped to charge the capacitor 122 to the breakdown voltage of the Zener diode 128, the negative pulses on the base electrode 202 of the transistor 200 switches the flip-flop arrangement comprising the transistors 200 and 300 so that an output signal results at the output terminal 350. When the transistor 300 is rendered nonconductive, the output signal will appear at the terminal 350.

The output signal is also fed back through a capacitor 314 and resistor 316 to maintain the output long enough for the controlled elements to switch, and also to provide sharp switching action to avoid relay chatter.

The output from the pull-out protection circuit provides an input to the Memory element 26 causing removal of the output signal from the Memory element 26 thereby deenergizing the operating coil 12 of the field contactor 10 and disconnecting the field winding 4 from the excitation source 8. Where desired, the output from the pull-out protection circuit may also be used to open the line contactor 24 in any conventional manner to shut down the motor when pull-out occurs. It is to be noted that the potentiometer 126 controls the magnitude of stored charge per pulse on the capacitor 122 and thus allows election of the number of pulses required to initiate a pull-out signal.

The reciprocal output of the Memory element 26 as it appears from the NOR element 30 is used to discharge the counting capacitor 122. The negative output voltage from the NOR element 30 charges a capacitor 414 through a rectifier 402 and also drives a transistor 400 to saturation.

The transistor 400 having a base electrode 402, an emitter electrode 404, and a collector electrode 406 is connected with the emitter electrode 404 to ground 118 and the collector electrode 406 to the ungrounded side of the capacitor 122 through a resistor 408. The base electrode 402 is positively biased by the positive bus bar 116 through a biasing resistor 410. The base electrode 402 is also connected to receive the reciprocal output of the Memory element 26 through a resistor 412 connected to the ungrounded side of the capacitor 414.

When the Memory element 26 is switched to have an output by the synchronizing circuit 22 upon proper conditions for synchronization the reciprocal output from the NOR element 30 is connected to ground 118. The capacitor 414 then discharges through the base electrode 402 of the transistor 400 keeping it conducting for an interval when synchronizing transients may occur in the excitation field winding. Thus, the switching transients incident to synchronizing the motor do not contribute to the charge accumulation on the counting capacitor 122.

Upon occurrence of a pull-out condition, the pull-out signal appearing at the output terminal 350 switches the reciprocal output of the Memory element 26 "on" making the transistor 400 conductive and thereby discharging the capacitor 122. The path through the resistor 408 and transistor 400 also serves as a high resistance discharge path for the counting capacitor 122 so that the charge accumulated by a transient fault condition will slowly discharge from the counting capacitor 122 after a suitable time period sufficient to insure that the disturbance was in fact transient in nature.

The discharge circuits provided for the counting capacitor 122 insures that a full number of counts is available in the capacitor 122 upon occurrence of the next disturbance acting upon the synchronous motor. The discharge paths insure that the charge accumulated upon the capacitor 122 during transients is not "remembered" indefinitely.

Thus, it is readily apparent that the present invention has provided means for improving the response and accuracy of the pull-out protection scheme disclosed and claimed in the previously mentioned copending application Serial No. 811,664, filed May 7, 1959, and assigned to the same assignee. The present invention provides for resetting the pull-out protection circuit immediately after pull-out occurs and also prevents the counting of pole slippage incident to synchronization. At the same time provisions are made for allowing the pull-out protection circuit to slowly "forget" disturbances as a result of transient conditions which may cause fault indications of a pull-out condition.

While certain specific embodiments of the invention have been shown and described for the purpose of illustration, it is to be understood that various modifications, substitutions and alterations within the spirit and scope of the invention are herein meant to be included. As, for example, the transistors have been illustrated to be of the PNP type but it is to be understood that the NPN type of transistors may be used with suitable changes and polarity within the control circuitry.

I claim as my invention:

1. In a pull-out protection circuit for a synchronous motor having a field winding adapted to be connected to an excitation source, pulse generating means responsive to the frequency of the induced current in the field winding of said synchronous motor for producing a pulse of time length proportional to each cycle of said induced current, differentiating means for providing a narrow pulse for each said pulse regardless of the frequency of the induced current, integrator means responsive to a predetermined number of narrow pulses for providing a pull-out signal, means responsive to said pull-out signal for disconnecting said field winding from the excitation source, and means for preventing said integrator means from responding to frequency slippage incident to synchronization of the motor.

2. In a pull-out protection circuit for a synchronous motor having a field winding adapted to be connected to an excitation source, pulse generating means responsive to the frequency of the induced current in the field winding of said synchronous motor for producing a pulse of time length proportional of each cycle of said induced current, differentiating means for providing a narrow pulse for each said pulse regardless of the frequency of the induced current, capacitive means connected to said differentiating means responsive to the narrow pulses for accumulating charge proportional to the number of narrow pulses, means responsive to a predetermined level of said charge for disconnecting said field winding from the excitation source, discharge means across said capacitive means for discharging said capacitive means at a relatively slow rate when the charge is below said predetermined level and for discharging said capacitive means at a relatively fast rate when the charge is at least at the predetermined level.

3. In a pull-out protection circuit for a synchronous motor having a field winding adapted to be connected to an excitation source, pulse generating means responsive to the frequency of the induced current in the field winding of said synchronous motor for producing a pulse of time length proportional to each cycle of said induced current, differentiating means for providing a narrow pulse for each said pulse regardless of the frequency of the induced current, capacitive means connected to said differentiating means responsive to the narrow pulses for accumulating charge proportional to the number of narrow pulses, means for adjusting the quantity of charge accumulated per narrow pulse, means responsive to a predetermined level of said charge for disconnecting said field winding from the excitation source, discharge means across said capacitive means for discharging said capacitive means at a relatively slow rate when the charge is below said predetermined level and for discharging said capacitive means at a relatively fast rate when the charge is at least at the predetermined level.

4. In a pull-out protection circuit for a synchronous motor having a field winding adapted to be connected to an excitation source, pulse generating means responsive to the frequency of the induced current in the field winding of said synchronous motor for producing a pulse of time length proportional to each cycle of said induced current, differentiating means for providing a narrow pulse for each said pulse regardless of the frequency of the induced current, integrator means connected to said differentiating means and including capacitive means for accumulating charge proportional to the number of narrow pulses, signaling means responsive to a predetermined level of charge for providing a pull-out signal, discharge means including a transistor, a base electrode, collector electrode, and emitter electrode, said capacitive means connected across the collector-emitter electrode circuit, said base electrode connected to said signaling means rendering said transistor conductive upon occurrence of said pull-out signal.

References Cited in the file of this patent

UNITED STATES PATENTS

| | | |
|---|---|---|
| 2,245,189 | Ewing | June 10, 1941 |
| 2,530,997 | Schaelchlin | Nov. 21, 1950 |
| 2,632,875 | Bellinger | Mar. 24, 1953 |
| 2,709,235 | Baude | May 24, 1955 |
| 2,914,718 | Baude | Nov. 24, 1959 |